United States Patent [19]

Lipski

[11] 4,231,241
[45] Nov. 4, 1980

[54] VEHICLE SHIFTER LOCKING DEVICE

[75] Inventor: Frank F. Lipski, Los Angeles, Calif.

[73] Assignee: Marshall A. Lerner, Los Angeles, Calif.; trustee of Henry Bissell, a part interest

[21] Appl. No.: 936,631

[22] Filed: Aug. 24, 1978

[51] Int. Cl.² .................. B60R 25/06; E05B 65/12; G05G 1/04; G05G 5/06
[52] U.S. Cl. .................................... 70/195; 70/201; 70/245; 74/523; 74/538
[58] Field of Search .............. 70/195, 181, 245, 247, 70/201, 194, 193, 215, 230, 232, 258, DIG. 57; 74/538, 523, 535, 473 P; 16/121

[56] References Cited

U.S. PATENT DOCUMENTS

| 999,462 | 8/1911 | Miller | 70/195 |
|---|---|---|---|
| 1,198,341 | 9/1916 | Geery | 70/195 |
| 1,430,837 | 10/1922 | Oakes | 70/232 X |
| 1,638,688 | 8/1927 | Fipps | 70/195 |
| 1,662,099 | 3/1928 | Anderson | 70/201 X |
| 1,710,452 | 4/1929 | Drolette et al. | 16/121 |
| 1,733,245 | 10/1929 | Snelling | 70/230 X |
| 1,752,463 | 4/1930 | Smythe et al. | 70/195 |
| 1,859,328 | 5/1932 | Cobb | 74/538 X |
| 1,888,728 | 11/1932 | Johnson | 74/473 P |
| 3,431,755 | 3/1969 | Eisenman | 70/247 X |
| 3,583,184 | 6/1971 | Papale | 70/247 X |
| 3,710,606 | 1/1973 | Prince | 70/247 X |
| 3,817,065 | 6/1974 | Sander | 70/232 |

FOREIGN PATENT DOCUMENTS

| 800104 | 9/1950 | Fed. Rep. of Germany | 70/232 |
|---|---|---|---|
| 37732 | 10/1930 | France | 70/195 |
| 348605 | 5/1931 | United Kingdom | 70/247 |

*Primary Examiner*—Roy D. Frazier
*Assistant Examiner*—Carl F. Pietruszka
*Attorney, Agent, or Firm*—Marshall A. Lerner

[57] ABSTRACT

A locking device for preventing the theft of certain vehicles equipped with automatic transmissions. The device is designed to mount on the shift lever of certain types of automatic transmissions and prevent shifting out of the PARK position, thus preventing theft of the automobile, even though the engine may be started by unauthorized means. The device is readily attachable to automatic transmission shift levers of the type for which it is designed, cannot be removed without a key, is positive in operation so as to prevent shifting of the transmission when locked, is simple and economical to manufacture, and is reliable and effective in preventing unauthorized operation of a vehicle.

12 Claims, 3 Drawing Figures

VEHICLE SHIFTER LOCKING DEVICE

BACKGROUND OF THE INVENTION

1. Field of the Invention

This invention relates to vehicle protection devices and, more particularly, to such a device for preventing the propulsion of a vehicle, even though its engine may be running.

2. Description of the Prior Art

A wide variety of theft prevention devices and systems have been developed for use with automobiles and similar type vehicles. Such devices fall generally into two separate categories: those which are designed to provide a signal, such as a siren or flashing lights, if the vehicle is being broken into; and those which are designed to prevent the engine from being started, even though the ignition switch might be bypassed. More elaborate versions of the first category may even be arranged to transmit an alarm signal to activate a remote paging device carried on the person of the owner, for example.

It is generally a relatively simple matter for a professional car thief to bypass such devices. It may take as little as fifteen seconds for such a thief to bypass an ignition system lock after entry into the automobile and such thieves usually find it a simple matter to gain entry. Many cars can be unlocked simply by expert manipulation of a coat hanger or similar implement. In such an instance, the devices of the type which provide a warning of some kind to the owner merely serve to indicate that the car is being driven away. Those devices designed to prevent the engine from being started can usually be bypassed rather readily by a professional thief, simply by the process of "hot-wiring" the ignition. The steering column lock often associated with the ignition switch can be pulled out very easily by tools which are designed for the purpose.

Vehicle protection systems of the type described can be very expensive. Prices generally start at approximately $35.00 and can run upwards of several hundreds of dollars, depending on the sophistication and complexity of the system. Moreover, installation of such systems usually requires the services of a professional installer, further increasing the cost to the owner.

The trend in recent years has been toward the inclusion of automatic transmissions in the major proportion of all new cars sold in this country. This is particularly true with respect to American-made cars and is applicable to even the high powered sport cars, such as the Corvette. In California, in fact, it has not been possible in the last few years to purchase a new automobile with engines above a certain performance rating equipped with anything other than an automatic transmission. As manufactured, many of the "sporty" type automobiles in the General Motors line utilize the same type of shift lever for the automatic transmission. This lever incorporates a hand grip on the end of a vertical shift lever extending upwardly through the floor from the automatic transmission and has a centrally positioned, thumb-operated push rod or button for disengaging the locking pawl preparatory to shifting the transmission out of the PARK position. Automobiles of the type referred to include the Corvette, the Z-28, the Trans Am, the Grand Am, the Camero, the Firebird, and the like.

Corvettes from 1964 to the current model which are equipped with automatic transmissions have the shifter grip in the form of a ball which is screwed onto the threaded end of the hollow shift lever. The ball has a vertically oriented, central bore into which the shifter post extends upwardly from the hollow shift lever. Extending from the upper end of the bore is a projecting push rod or push button which is threaded onto the shifter post. This push rod must be moved downwardly, conventionally by the driver's thumb as his right hand encircles the shifter grip, in order to shift the transmission out of the PARK position. It will be appreciated that if some means can be provided for effectively preventing the downward movement of this push rod, the transmission cannot be shifted out of the PARK position, even though the engine may be running and the automobile otherwise fully operative. Since in the PARK position the transmission (and thereby the rear wheels) are locked against turning, such a means can effectively prevent the automobile from being moved unless the rear wheels are physically raised off the ground, as by resort to a tow truck. If a tow truck is to be used in the theft of an automobile, no theft prevention system presently known can protect the automobile.

As presently manufactured, the PARK release mechanism and the ignition lock are interlocked so that the automatic transmission cannot be shifted out of PARK unless the ignition is turned on. However the interlocking mechanism is cable actuated and releases the PARK latch when the ignition lock is activated. The ease with which a car thief can bypass the ignition key lock renders this transmission locking mechanism relatively ineffectual. What is needed is a positive locking mechanism, independent of the ignition lock, which can only be controlled by a key and which cannot be disabled by a would-be thief without great difficulty and the expenditure of considerable time.

SUMMARY OF THE INVENTION

In brief, arrangements in accordance with the present invention comprise a shifter grip mechanism for replacing the shifter grip mechanism of a particular automobile having an automatic transmission in which the PARK position locking pawl is operated as described. Arrangements in accordance with the invention are designed to resemble in appearance the particular shifter grip to be replaced. A preferred embodiment of the invention as described herein is shaped to resemble in appearance the shifter grip of a Corvette, but the principles of the invention are adaptable to other shifter grips which differ in appearance but are similar in function and operation.

Embodiments of the present invention incorporate a cylinder type lock as the thumb-operated push button. The shifter ball is formed with a recessed slot extending about the interior bore of the shifter grip. The cylinder lock has a protruding, retractable latch member and is mounted on the PARK position locking pawl release post so that the latch is in position to engage the interior peripheral slot when the cylinder lock is placed in the locked condition. When so locked, the push button cannot be moved up or down, so that the shifter release post cannot be activated to release the transmission from the PARK position.

In accordance with an aspect of my invention, the grip ball and the lock are designed for ready substitution in place of the conventional shifter grip and push button. The factory-equipped shifter grip and push button are readily removable by simply unscrewing from their respective mounting positions. The push button is unscrewed from the top of the shifter release post and the shifter grip is unscrewed from the top of the hollow shift lever through which the post extends. The replacement shifter grip and cylinder lock of my invention can then be screwed in position in place of the two elements they are replacing. A key must now be used with the cylinder lock to retract the latch member so that the cylinder lock (push button) can be moved downwardly to drive the release post to release the locking pawl and permit the transmission to be shifted out of the PARK position.

If this were all that was involved, it would be just as easy to remove the shifter grip and cylinder lock together by unscrewing them from their threaded mountings as it is to remove the factory-equipped shifter grip and push button. This would hardly be an effective deterrent to any car thief. Therefore, in accordance with a further aspect of my invention, I provide an arrangement in the form of a washer and lock nut for retaining the shifter grip against being unscrewed from its threaded mounting on the end of the shift lever. This retaining mechanism is recessed within the shifter grip and bears against an interior ledge or shoulder within the shifter grip. It is only accessible by removal of the cylinder lock. However, the cylinder lock can only be removed through use of the key. Accordingly, any unauthorized individual cannot remove the shifter grip without use of the key. In other words, the key is not only required in order to permit the shifter release mechanism to be operated, but it is also necessary to permit the shifter grip to be removed from the shift lever. (It will be appreciated that if the shifter grip could be removed, the release post is readily accessible for direct operation to permit shifting of the transmission out of PARK.)

In accordance with a further aspect of my invention, I have devised this arrangement so that it can very readily be installed in place of the readily removable, original shifter grip of the automobile. As indicated, the push button unscrews from the threaded upper end of the release post and the shifter grip unscrews from the threaded upper end of the shift lever. The replacement locking shifter grip of my invention is then installed simply by screwing the shifter grip onto the threaded shift lever, inserting the washer and lock nut into the bore of the shifter grip and tightening the nut in place on the threaded end of the release post by means of a socket wrench fitting into the bore so that the release post extends approximately ¼" above the nut, and then threading the cylinder lock onto the end of the release post to the point where its extendible latch member is in position to engage the recessed internal slot in the shifter grip. With the device installed in this fashion, the cylinder lock cannot be unscrewed because its latch member engages the slot in the shifter grip, and the shifter grip cannot be unscrewed because it is retained by the lock nut and washer bearing against the interior ledge in the bore of the shifter grip, which retaining mechanism is inaccessible without first removing the cylinder lock.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Figure 1:
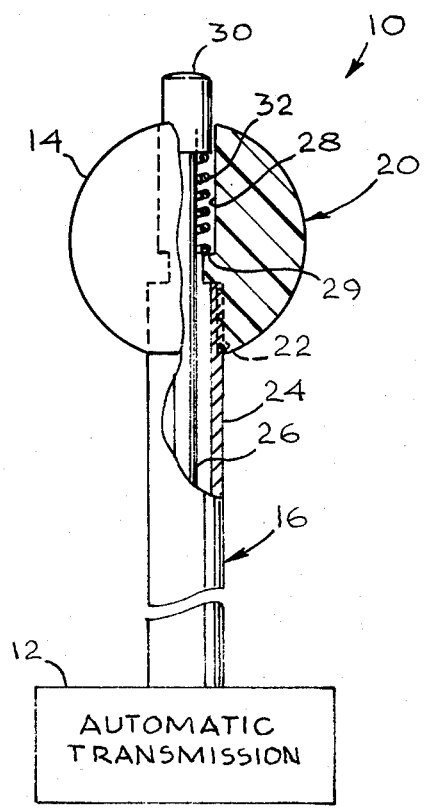
FIG. 1 is a diagram, partially in section, showing a conventional shifter grip and release mechanism utilized in Corvettes with automatic transmissions.

FIG. 1 illustrates schematically in partial section a shifter 10 as original equipment provided with an automatic transmission 12 of a Corvette as presently manufactured by General Motors Corporation. The shifter 10 comprises a shifter grip 14 threadably mounted to a shift lever 16 extending from the automatic transmission 12. The shift lever 16 comprises a hollow housing 24 encasing a shifter release post 26. The shifter grip 14 principally comprises a ball 20 having a lower threaded opening 22 for receiving the threaded end of the hollow shift lever housing 24 of the shift lever. The ball 20 has a hollow bore 28, reduced in diameter through its mid portion to fit about the release post 26 and enlarged in its upper portion to define a ledge 29. A shifter release button or push rod 30 is threaded onto the upper end of the release post 26 and urged upwardly by a compression spring 32 which encircles the release post and extends between the lower end of the release button 30 and the ledge 29.

In operation, the transmission when in the PARK position is locked in PARK by a pawl controlled by the release post 26. To shift the transmission out of PARK position, the driver places his hand around the shifter grip 14 and presses downwardly with his thumb on the button 30, thereby moving the release post 26 downwardly against the biasing force of the spring 32 to release the locking pawl in the transmission. Since the button 30 is threaded on the end of the release post 26 and the shifter grip 14 is threaded onto the upper end of the shift lever housing 24, it will be understood that the entire assembly can be readily removed from the shift lever 16 simply by unscrewing the respective threadably mounted push button 30 and shifter grip 14.

Figure 2:
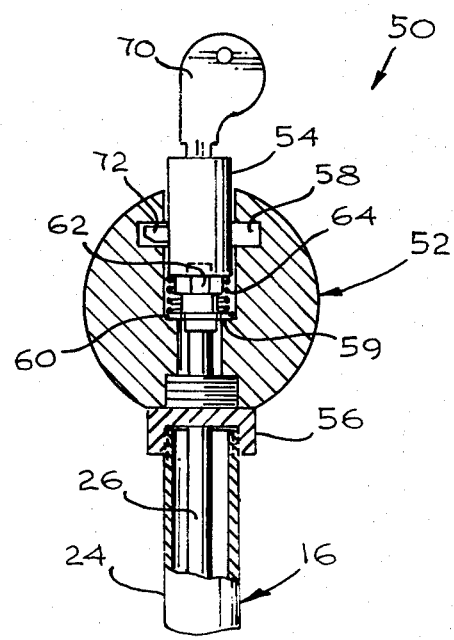
FIG. 2 is a similar view in section of the device in accordance with the present invention for replacing the shifter grip of FIG. 1.
Figure 3:
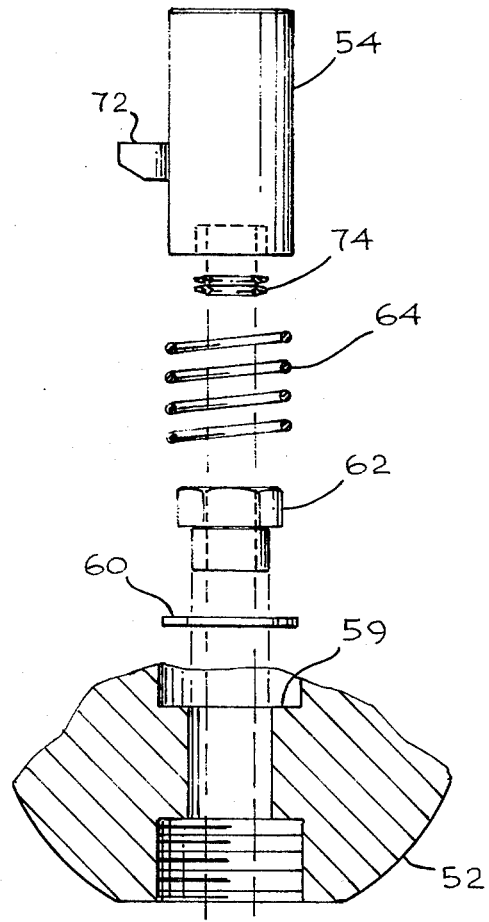
FIG. 3 is an exploded view, partially in section, illustrating the various components of the device of FIG. 2 in further detail.
Figure 3:
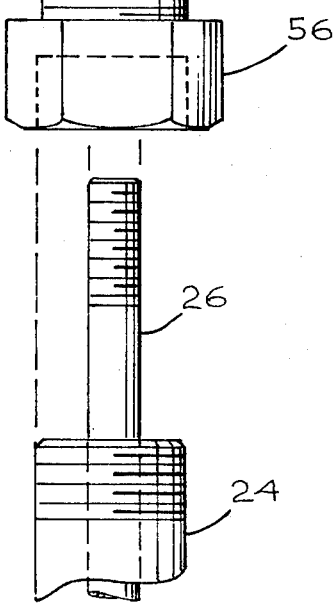

FIGS. 2 and 3 illustrate a preferred embodiment of the present invention which is designed to be mounted in place of the release button 30 and shifter grip 14 of FIG. 1 for operating the shifter and automatic transmission in similar fashion but with the theft protection feature afforded by the present invention.

The theft prevention device 50 of the present invention is shown comprising a shifter grip ball 52 and cylinder lock 54 which replace, respectively, the ball 20 and the release button 30 of the device of FIG. 1 for mounting on the shift lever 16. This mounting is facilitated by an adapter 56 which threads into the lower portion of the ball 52 and in turn is threaded onto the shift lever housing 24. This serves to accommodate the dimensions and spacing of the various components of the device 50 to the threaded ends of the release post 26 and the shift lever housing 24 so that the cylinder lock 54 and grip ball 52 are relatively positioned according to the two components they replace. The ball 52 is provided with an internal bore arranged to accommodate the release post 26 extending upwardly into the bore portion of the ball and the cylinder lock 54 which is inserted from above. The internal bore of the ball 52 is shaped with a milled internal slot or recess 58, preferably extending all the way around the bore, and defines a shoulder 59 in the lower portion of the ball 52. Also provided are a washer 60, a lock nut 62, and a compression spring 64. The hollow washer 60 is inserted to rest upon the ledge 59 and be held in position by the lock nut 62, which has a shouldered upper portion and includes an extended lower portion adapted to project through the washer for guiding the movement of the nut and release post relative to the washer, and which is threaded all the way onto the upper end of the release post 26 so that the release post 26 extends upwardly past the lock nut 62 sufficiently to be engaged by the lock 54 while permitting the necessary downward movement of the push button-lock 54 to actuate the release post 26 in releasing the locking pawl for shifting from the PARK position.

The lock 54 may be a commercially available type of cylinder lock such as is marketed by Medeco Security Locks, Inc. of Salem, Va. under Catalog No. 64-150. It is locked and unlocked by a key 70 insertable in the upper end of the lock 54. When inserted and rotated, the key 70 retracts a latching member 72 into the unlocked position. When the lock 54 is in the locked position with the latching member 72 extended, the member 72 fits within the slot 58 and prevents the lock 54 from being moved upwardly or downwardly, relative to the ball 52. Thus, the push button lock 54 cannot drive the release rod 26 to permit the shifter to shift the transmission out of the PARK position as long as the lock 54 is locked. When the lock 54 is to be locked, the key 70 is removed, of course.

The Medeco lock, as purchased, is modified to enable it to be threaded onto the release post 26. I accomplish this by drilling a shallow hole in the lower end of the lock 54 and then inserting a tempered steel threaded insert 74 (see FIG. 3) commercially known as a Helicoil. The key is also modified to enable it to be removed in the unlocked position, as well as in the locked position.

The ball 52 cannot be removed from the shift lever 16 without first removing the lock 54, and this requires use of the key 70. Any efforts to remove the ball 52 by unscrewing it from the end of the shift lever housing 24 drive the retaining washer 60 up against the lock nut 62 which is threaded onto the release post 26 and serves to prevent any further unscrewing of the ball 52. The lock nut 62 is only accessible through the upper opening in which the lock 54 is mounted. Thus it will be seen that, while the device of my invention may be very easily installed and readily removed, if desired, by a person who has the key 70 to unlock the lock 54, it cannot be removed without use of the key 70, once the device is installed.

The ball 52 may be fabricated of plastic, if desired, although I prefer to make it of metal, for security reasons. It may be of aluminum, anodized black to match the color of the factory-equipped shifter grip (for Corvettes), or it may be formed of hardened steel and suitably colored or otherwise covered, as with leather for example, to match the shifter grip being replaced. It might be provided with a different distinctive finish and/or shape to indicate to a would-be thief looking in from outside the car that the vehicle is equipped with this theft protection device. If the thief recognizes the futility of attempting to steal the car because the transmission cannot be shifted out of PARK, he might be deterred from even breaking into the vehicle.

Devices in accordance with the present invention are economical, extremely easy to install, and are virtually foolproof. As noted, although they are very easy to install, they cannot be removed without use of the key to unlock the locked portion of the device. They are adaptable to several models of automobiles presently on the market, including some models which are most susceptible and attractive to auto thieves. It would be a simple matter to manufacture virtually all automatic transmission-equipped automobiles with the type of shift mechanism for which the present invention is designed. Were this to be done, as might be mandated by federal or state law, it is believed that auto thefts could be drastically reduced.

Although there has been described above a specific arrangement of a vehicle shifter locking device in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A shifter locking device for use with a shifter for an automatic transmission having a PARK position, which shifter includes a shift lever housing and a lockable central release post projecting therefrom which is operative to release a latching mechanism retaining the transmission in said PARK position, comprising:

a shifter grip adapted for attachment to the shift lever housing in a position encasing the projecting release post;

a lock member attachable to the release post within the shifter grip and projecting therefrom to permit a user, by moving said lock member, when in an unlocked state, to move the release post to release the transmission latching mechanism; and means for preventing detachment of said shifter grip from said shift lever housing including shift grip retaining means located within the shifter grip between said lock member and said shift lever housing; and wherein said shift grip retaining means includes a nut threaded onto the release post and a washer positioned between said release post and said nut to thereby prevent detachment of said shifter grip from said shift lever housing when said lock member is in the locked state.

2. The device of claim 1 wherein said shifter grip has a bore formed therein with a portion of said bore having a reduced diameter to define an upward-facing ledge and wherein said washer is positioned against said ledge.

3. The device of claim 2 wherein said nut is threaded onto the release post within said bore with said washer positioned between said nut and said upward-facing ledge to limit rotation of said nut with respect to said shifter grip to thereby prevent detachment of said shifter grip from said shift lever housing when said lock member is in the locked state.

4. The device of claim 3 and wherein said nut includes an extended lower portion projecting through said washer whereby the rotation of said shifter grip urges said washer against the shoulders of said nut which is threadably attached to said release post to prevent further rotation of said shifter grip to thereby prevent removal of said shifter grip from the shift lever housing.

5. The device of claim 4 and further including a compression spring positioned between said washer and said lock member for biasing said lock member upwardly.

6. The device of claim 1 and further including means for preventing axial movement of said lock member when in a locked state, including an extendable latch member mounted in said lock member and a recessed circumferential slot within said shifter grip for receiving said extendable latch member when in the extended state.

7. The device of claim 6 wherein said lock member comprises a cylinder lock having a threaded opening at its lower end for threadably mounting on the end of the release post.

8. The device of claim 1 wherein said lock member includes a cylinder lock which is operable when in the locked state to render said nut and washer inaccessible to prevent removal of said nut to thereby prevent detachment of said shifter grip.

9. The device of claim 8 wherein said shifter grip has a bore formed therein with a portion of said bore having a reduced diameter to define an upward-facing ledge and wherein said washer is positioned against said ledge.

10. The device of claim 9 wherein said nut is threaded onto the release post within said bore with said washer positioned between said nut and said upward-facing ledge to limit rotation of said nut with respect to said shifter grip.

11. The device of claim 10 wherein said nut includes an extended lower portion projecting through said washer whereby the rotation of said shifter grip urges said washer against the shoulder of said nut which is threadably attached to said release post to prevent further rotation of said shifter grip to thereby prevent removal of said shifter grip from the shift lever housing.

12. The device of claim 11 and further including a compression spring positioned between said washer and said lock member for biasing said lock member upwardly.

* * * * *